June 30, 1925.
J. A. McMASTER
1,544,258
ADJUSTABLE FOOT REST FOR AUTOMOBILES
Filed Aug. 12, 1924
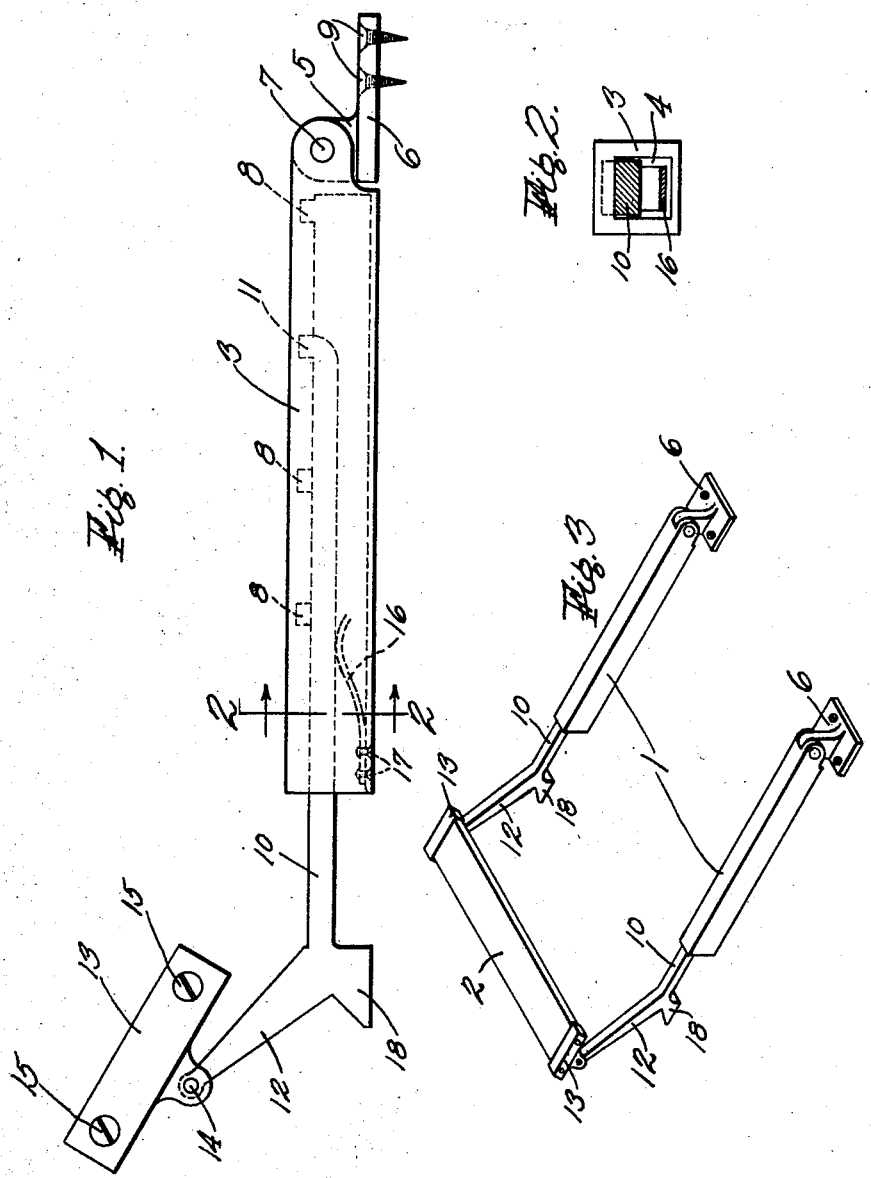
INVENTOR
James A. McMaster
BY Chapin & Neal.
ATTORNEYS Patented June 30, 1925.

1,544,258

UNITED STATES PATENT OFFICE.

JAMES A. McMASTER, OF SPRINGFIELD, MASSACHUSETTS.

ADJUSTABLE FOOT REST FOR AUTOMOBILES.

Application filed August 12, 1924. Serial No. 731,670.

*To all whom it may concern:*

Be it known that I, JAMES A. MCMASTER, a subject of the King of Great Britain, residing at Springfield, in the county of Hampden and State of Massachusetts, have invented new and useful Improvements in Adjustable Foot Rests for Automobiles, of which the following is a specification.

This invention relates to foot rests for automobiles or other similar vehicles and one of its principal objects is to provide a foot rest which may be adjusted to several various positions to suit the particular leg reach of the occupant or occupants of the vehicle.

A further object is to provide a simple and practical foot rest which is positively retained in the desired adjusted position but which may be easily and conveniently changed to a number of different positions.

A still further object is to construct an adjustable foot rest wherein the foot board remains at the same distance from the floor of the automobile in its different adjusted positions.

With these and other objects in view I have illustrated a preferred embodiment of my invention in the drawings in which:

Fig. 1 is a side view of one side member of my improved foot rest,

Fig. 2 is a vertical section taken on the line 2—2 of Fig. 1 and,

Fig. 3 is a perspective view of an assembled foot rest.

Referring to the drawings, and particularly to Fig. 3 it will be seen that my improved foot rest consists of the two parallel side members 1—1 connected across one of their ends by a cross piece 2 which is the foot rest proper.

The other ends of the side members are hingedly secured to floor of the automobile as is the practice in the usual foot rest of this type. Each of the side members are identical and the construction and operation of these side members will be readily understood by the following description of one of them taken in connection with Figs. 1 and 2.

Each side member 1 consists of a hollow casing 3, preferably made of some light and strong metal, open at one end and closed at the other end. The closed end is constructed with a yoke in which there is hingedly mounted a lug 5 of a small plate 6 by means of a rivet or bolt 7. This plate 6 is also provided with screw holes by which it is affixed to the floor of the automobile by means of screws 9, whereby the casing 3 is hingedly secured to the floor.

The bore 4 of the hollow casing 3 is preferably of rectangular shape in cross section as shown in Fig. 2, and extends through to the closed end. The upper inside surface of the bore 4 is provided with a series of notches 8—8 spaced at approximately equal intervals for a purpose which will be presently described.

In the hollow casing 3 there is adapted to telescope a bar 10 which has a small projection 11 at its inner end and an inclined arm 12 at its outer end. At the upper end of the arm 12 there is swivelly mounted a foot board bracket 13 by means of a bolt or rivet 14 passing through a lug on the bracket and a hole in the end of the arm. This bracket 13 is provided preferably with a rectangular socket into which an end of the foot board 2 is adapted to fit and be secured thereto by means of screws 15 passing through the bracket.

The bar 10 is adapted to slide freely in the casing and its vertical thickness is somewhat less than the height of the bore 4. A strong leaf spring 16 is fastened by screws 17—17, or other means, to the bottom of the bore 4 and the free end of this spring presses the inner portion of the bar against the upper inside surface of the casing. The outer end of the bar 10 is provided with a small foot 18 for a purpose which is readily apparent.

It will be seen from the foregoing description that the bar 10 is slidably held in the casing 3 and that when the projection 11 on the inner end of the bar registers with one of notches 8 on the inner surface of the casing that the bar is releasably locked in that position but is easily pulled out or pressed in to give any desired extension to the arm 12.

It will be thus observed that in an assembled foot rest consisting of a pair of these side members and the foot board that a foot rest has been provided having a number of adjustable positions which when not in use may be folded back out of the way and that in any of its adjustable positions the foot board remains the same distance from the floor. The foot board itself may also have, relative to its distance from the floor, two positions, that which is shown in Fig. 3 and one where it is swung around 180° by reason of the swivel fastening of the foot board brackets to the arms of the adjustable bars.

Claims:

1. An adjustable foot rest for automobiles and the like, comprising a pair of side members and a foot board or rest connecting said side members, each side member comprising a hollow casing hingedly secured to the floor of the automobile, a bar telescoping within said casing and having a foot board bracket for said foot board at the outer end thereof, said bar fitting loosely within said casing and having a certain amount of latitudinal play therein, and means comprising a tension member located wholly within said casing for locking said foot board in a plurality of different positions.

2. An adjustable foot rest for automobiles and the like, comprising a pair of side members connected by a foot board or rest, each side member comprising a hollow portion having a plurality of notches therein and a bar portion telescoping therein and having a projection thereon, one of said portions adapted to be hingedly secured to the floor of an automobile and the other portion having a foot board bracket mounted to swivel thereon and a spring within said hollow portion for releasably holding said projection in any one of said notches whereby said foot rest may be adjusted and locked in any one of the notched positions.

3. An adjustable foot rest for automobiles and the like, comprising a pair of side members connected by a foot board or rest, each side member comprising a hollow casing hingedly secured to the floor of the automobile and having a plurality of notches therein, a bar telescoping within said casing and having a foot board bracket mounted to swivel on the outer end and a projection on the inner end thereof, and a spring within said casing for releasably holding said projection in any one of the said notches whereby said foot rest may be adjusted and locked in any one of the notched positions.

4. An adjustable foot rest for automobiles and the like, comprising a pair of side members connected by a foot board or rest, each side member comprising a hollow casing hingedly secured to the floor of the automobile and having a plurality of notches in the upper inside surface thereof, a bar telescoping within said casing and having a foot board bracket mounted to swivel on the outer end and an upstanding projection on the inner end thereof, a spring within said casing for supporting the inner portion of said bar against the upper inside surface of said hollow casing with said projection registering with one of said notches and a foot portion on said bar for supporting the outer end thereof on the floor of the automobile.

In testimony whereof I have affixed my signature.

JAMES A. McMASTER.